(12) United States Patent
Gulwani et al.

(10) Patent No.: US 7,729,999 B2
(45) Date of Patent: Jun. 1, 2010

(54) PROGRAM VERIFICATION AND DISCOVERY USING PROBABILISTIC INFERENCE

(75) Inventors: Sumit Gulwani, Redmond, WA (US); Vladimir Jojic, Toronto (CA); Nebojsa Jojic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 11/622,904

(22) Filed: Jan. 12, 2007

(65) Prior Publication Data

US 2008/0172650 A1 Jul. 17, 2008

(51) Int. Cl.
*G06F 15/18* (2006.01)
(52) U.S. Cl. .......................... 706/12; 717/106
(58) Field of Classification Search .............. 706/12; 717/106
See application file for complete search history.

(56) References Cited

U.S. PATENT DOCUMENTS

2006/0236305 A1* 10/2006 Chang et al. ................ 717/106

OTHER PUBLICATIONS

"Ten Years of Hoare's Logic: A Survey—Part I", ACM Transactions on Programming Languages and Systems (TOPLAS), vol. 3, Issue 4 (Oct. 1981), pp. 431-483.*
"A verification framework for agent programming with declarative goals", by de Boer et al, Journal of Applied Logic, 2005, pp. 277-302.*

* cited by examiner

*Primary Examiner*—David R Vincent
*Assistant Examiner*—Mai T Tran
(74) *Attorney, Agent, or Firm*—Workman Nydegger

(57) ABSTRACT

In one embodiment, a computer system performs a method for verifying the validity or invalidity of a software routine by learning appropriate invariants at each program point. A computer system chooses an abstract domain that is sufficiently precise to express the appropriate invariants. The computer system associates an inconsistency measure with any two abstract elements of the abstract domain. The computer system searches for a set of local invariants configured to optimize a total inconsistency measure which includes a sum of local inconsistency measures. The computer system optimizes the total inconsistency measure for all input/output pairs of the software routine. In one embodiment, the optimization of total inconsistency is achieved by the computer system which repeatedly replaces a locally inconsistent invariant with a new invariant, randomly selected among the possible invariants which are locally less inconsistent with the current invariants at the neighboring program points.

20 Claims, 3 Drawing Sheets

PROGRAM VERIFICATION AND DISCOVERY USING PROBABILISTIC INFERENCE

BACKGROUND

Throughout the world, computers and embedded computing devices have been incorporated into nearly every facet of daily life. Computers process instructions by interpreting and executing software source code. Source code is typically written by software developers using one or more programming and/or scripting languages. Source code is often lengthy and complex, involving numerous functions and routines. Debugging source code can often be a tedious job for software developers.

In order to make the debugging process easier for software developers, source code is typically written within an integrated development environment (IDE). IDE's are software programs that have many features which are aimed to prevent developers from making mistakes while writing the source code (e.g. code coloring, syntax prompting, etc.). IDE's also provide a means for identifying bugs that the developer may have overlooked and are still present in the code during the time of compilation. However, finding syntactical bugs in the source code is only a small part of debugging software. Functional, or semantic, problems are much more difficult to troubleshoot and solve. Current IDE's have no mechanism for resolving semantic problems within the source code.

Furthermore, in many cases, developers may be uncertain as to the validity as of a certain software function or routine. For example, a developer may have a known input and expected output and may want to know whether a given function or routine will produce the expected output based on the known input. Techniques for validating software typically require the knowledge or learning of invariants at different program points. Invariants are facts about the program that hold at the corresponding program points under all program executions. If the invariant holds true at the program point (i.e. the routine at the program point would allow a first state from the set of states to arrive at the second state), the routine is valid at that program point.

The field of machine learning is broadly concerned with developing algorithms and techniques that allow computers to learn. One way computers can "learn" is by analyzing massive amounts of data and attempting to discover rules or patterns that explain how the data was generated. In a method called "supervised learning", an algorithm can attempt to generate a function that maps inputs to desired outputs. Often, in order to generate such functions, a technique known as probabilistic inference is used. Other forms of machine learning are used to decipher patterns in large quantities of statistical data. To the extent of our knowledge, however, machine learning has not been applied to learning program invariants.

BRIEF SUMMARY

Embodiments of the present invention are directed to systems and methods for verifying the validity or invalidity of a software routine by learning appropriate invariants at each program point. In one embodiment of this invention, a computer system performs a method for verifying the validity or invalidity of a software routine by learning appropriate invariants at each program point. A computer system chooses an abstract domain (e.g., boolean formulas) that is sufficiently precise to express the appropriate invariants. The computer system associates an inconsistency measure with any two abstract elements of the abstract domain. The inconsistency measure is a monotonic function of the difference of the sets of states represented by the two abstract elements. The computer system searches for a set of local invariants configured to optimize a total inconsistency measure which includes a sum of local inconsistency measures. The computer system optimizes the total inconsistency measure for all input/output pairs of the software routine. The computer system randomly selects an invariant that is locally inconsistent with the invariant's neighboring invariants and replaces the selected invariant with an invariant that is less locally inconsistent.

This Summary is provided to introduce a selection of concepts in a simplified form that are further described below in the Detailed Description. This Summary is not intended to identify key features or essential features of the claimed as subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
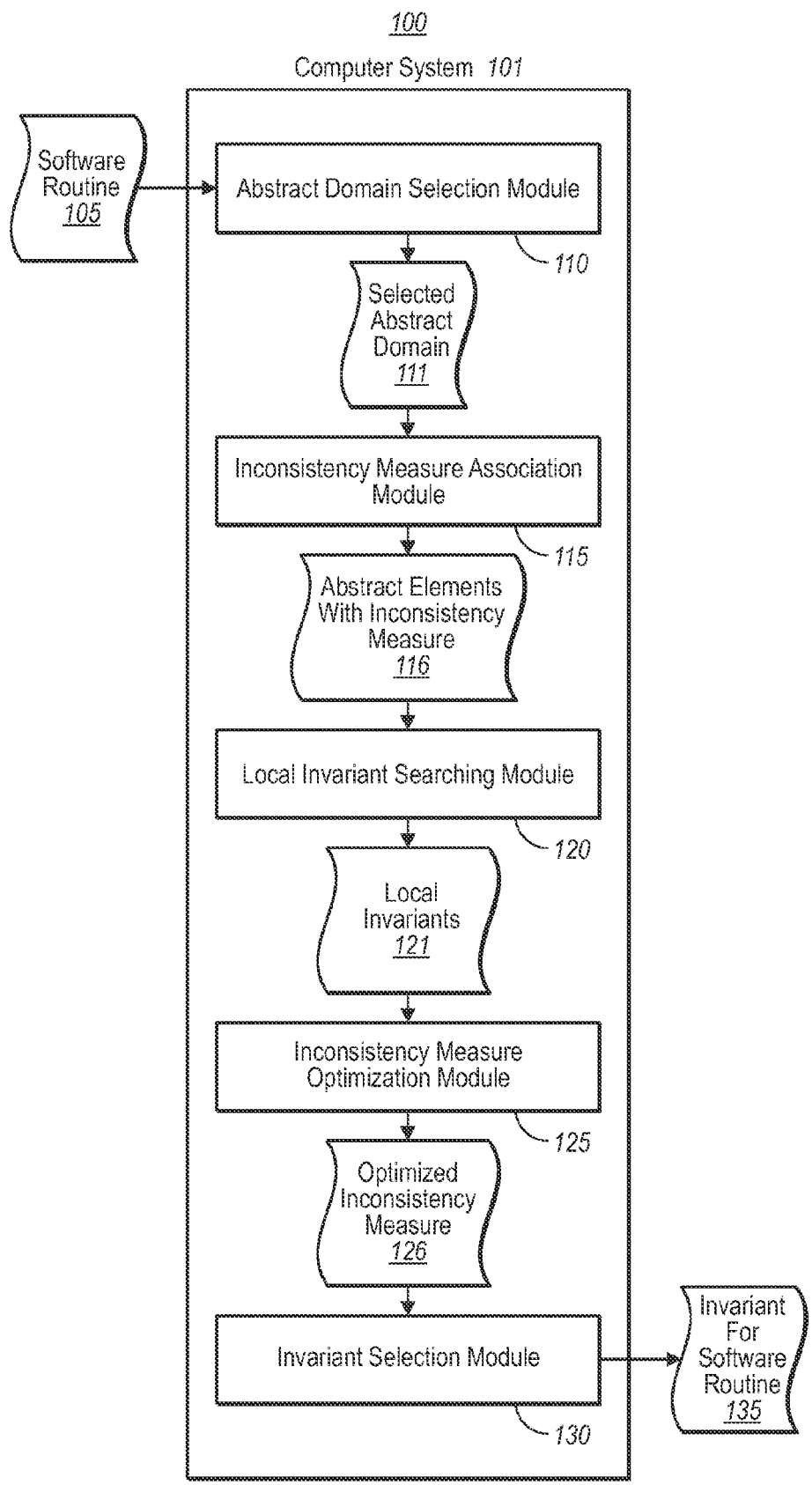
FIG. 1 illustrates a computer architecture in which embodiments of the present invention may operate including verifying the validity or invalidity of a software routine by learning appropriate invariants at each program point.

Embodiments of the present invention are directed to systems and methods for verifying the validity or invalidity of a software routine by learning appropriate invariants at each program point. In one embodiment of this invention, a computer system performs a method for verifying the validity or invalidity of a software routine by learning appropriate invariants at each program point. A computer system chooses an abstract domain (e.g., boolean formulas over difference constraints) that is sufficiently precise to express the appropriate invariants. The computer system associates an inconsistency measure with any two abstract elements of the abstract domain. The inconsistency measure is a monotonic function of the difference of the sets of states represented by the two abstract elements. The computer system searches for a set of local invariants configured to optimize a total inconsistency measure which includes a sum of local inconsistency measures. The computer system optimizes the total inconsistency measure for all input/output pairs of the software routine. The computer system randomly selects an invariant that is locally inconsistent with the invariant's neighboring invariants and replaces the selected invariant with an invariant that is less locally inconsistent. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored on the computer-readable media. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

FIG. 1 illustrates a computer architecture 100 in which the principles of the present invention may be employed. Computer architecture 100 includes computer system 101. In some embodiments, computer system 101 may be configured to receive software routine 105. Software routine 105 may be any type of software program, function, routine or combination thereof, or individual lines of source code. Computer system 101 includes an abstract domain selection module 110. In some embodiments, abstract domain selection module 110 may be configured to choose an abstract domain (e.g., Boolean formulas over difference constraints) that is sufficiently precise to express appropriate invariants and pass the selected abstract domain 111 to inconsistency measure association module 115, as will be explained in greater detail below.

Computer system 101 also includes inconsistency measure association module 115. In some embodiments, inconsistency measure association module 115 may be configured to receive selected abstract domain 111, associate an inconsistency measure with any two abstract elements (e.g.,) of the abstract domain, and pass the abstract elements with an inconsistency measure 116 to local invariant searching module 120, as will be explained in greater detail below. Computer system 101 also includes local invariant searching module 120. In some embodiments, consistency module 120 may be configured to receive abstract elements with an inconsistency measure 116 and determine whether an invariant at a program point is locally consistent with the invariant's neighboring invariants. Consistency module 120 may also be configured to pass local invariants 121, which includes invariants of the software routine, to inconsistency measure optimization module 125.

Computer system 101 also includes inconsistency measure optimization 125. In some embodiments, inconsistency measure optimization 125 may be configured to receive local invariants 121. Such local invariants may be configured to optimize a total inconsistency measure. Inconsistency measure optimization 125 may as also be capable of optimized inconsistency measure 126 to invariant selection module 130. Computer system 101 also includes invariant selection module 130. In some embodiments, invariant selection module 130 may be configured to receive optimized inconsistency measure 126 and randomly select an invariant that is less locally inconsistent with the invariant's neighboring invariants and replacing the selected invariant with an invariant that is less locally inconsistent, as will be explained in greater detail below.

Computer architecture 100 also includes an invariant for software routine 135. In some embodiments, invariant 135 is an invariant for software routine 105. Computer system 101 and/or invariant selection module 130 may be configured to transmit invariant 135 to an external destination or, alternatively, may simply pass the invariant to another program running on computer system 101.

Figure 2:
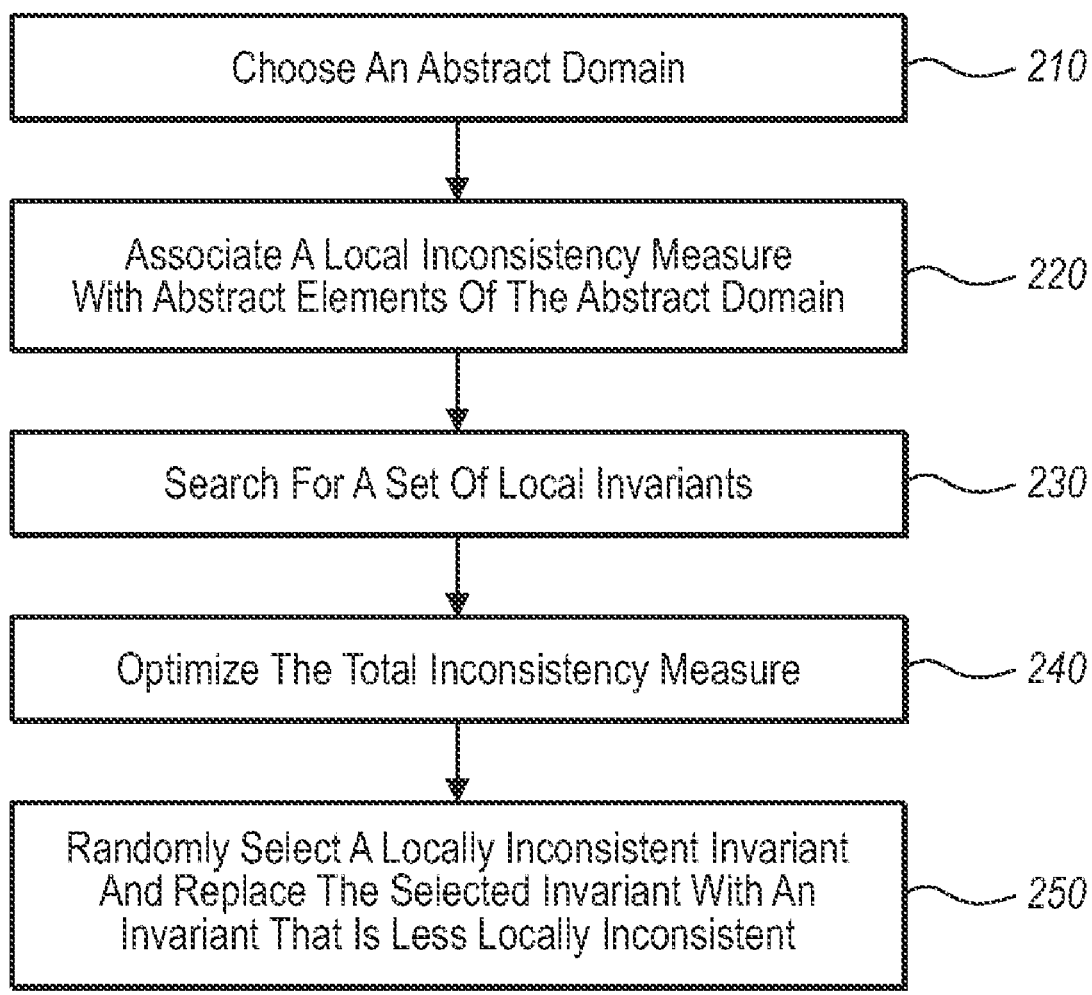
FIG. 2 illustrates a flowchart of an example method for verifying the validity or invalidity of a software routine by learning appropriate invariants at each program point.

FIG. 2 illustrates a flowchart of a method 200 for verifying the validity or invalidity of a software routine by learning appropriate invariants at each program point. The method 200 will now be described with frequent reference to the components and data of computer architecture 100.

Method 200 includes an act of choosing an abstract domain that is sufficiently precise to express the appropriate invariants (act 210). For example, abstract domain selection module 110 may choose an abstract domain (e.g. selected abstract domain 111) that is sufficiently precise to express the appropriate invariants. In some embodiments, the abstract domain may include a set of formulas with bounded boolean connectives over difference constraints. For example, FIG. 3 table 340 depicts a variety of formulas with bounded boolean connectives over difference constraints (e.g. at $\pi_2$ (y=50 OR x≧50) AND (y=x OR x<50) AND (y=100 OR x<100)). Difference constraints are formulas of the form "u−v relop c", or "u relop c", where u, v are variables, c is a constant, and relop (i.e. Relational Operation) is one of the following predicates: <, <=, =, or !=. The number of possible abstract domains is potentially unbounded. In other embodiments, computer system 101 may be configured to learning or discover one or more small programs from the one or more program's specifications in terms of a set of the program's input-output behavior.

Method 200 includes an act of associating an inconsistency measure with any two abstract elements of the abstract domain, wherein the measure is a monotonic function of the difference of the sets of states represented by the two abstract elements of the abstract domain (act 220). For example, inconsistency measure association module 115 may associate an inconsistency measure with any two abstract elements of the abstract domain (e.g. abstract elements with inconsistency measure 116), where the measure is a monotonic function of the difference of the sets of states represented by the two abstract elements of the abstract domain. As mentioned above, in order to learn an invariant at each program point of a software routine (e.g. software routine 105), different invariants may be sampled in an attempt to find an invariant that is consistent with the invariants before and after a program point.

In some embodiments, the inconsistency measure may be the proportion of the disjuncts in the disjunctive normal form version of a first boolean formula that do not logically imply the conjuncts in the conjunctive normal form version of a second boolean formula. For example, in cases where the majority of disjuncts of a first boolean formula do not logically imply the conjuncts of a second boolean formula, there is a high level of inconsistency. In cases where the majority of disjuncts of a first boolean formula do logically imply the conjuncts of a second boolean formula, as there is a low level of inconsistency.

Method 200 includes an act of searching for a set of local invariants configured to optimize a total inconsistency measure which includes a sum of local inconsistency measures (act 230). For example, local invariant searching module 120 may search for a set of local invariants 121 configured to optimize a total inconsistency measure which includes a sum of local inconsistency measures. Additionally or alternatively, a consistency determination module of computer system 101 may determine whether an invariant at a program point is locally consistent with the invariant's neighboring invariants. For example, in some cases, an invariant may be sampled at some program point. After the invariant has been sampled at that point, the invariant may be compared to the invariant's neighboring invariants to determine if the invariants before and after the program point are consistent.

Method 200 includes an act of optimizing the total inconsistency measure for all input/output pairs of the software routine (act 240). For example, inconsistency measure optimization module 125 may optimized the total inconsistency measure for all input/output pairs of software routine 105. Additionally or alternatively, upon determining that an invariant is locally inconsistent with the invariant's neighboring invariants, an invariant sampling module of computer system 101 may sample a different invariant that is less locally inconsistent with the invariant's neighboring invariants. In one embodiment, Gibbs sampling may be used to sample different invariants.

Method 200 includes an act of randomly selecting an invariant that is locally inconsistent with the invariant's neighboring invariants and replacing the selected invariant with an invariant that is less locally inconsistent (act 250). For example, invariant selection module 130 may randomly select an invariant that is locally inconsistent with the invariant's neighboring invariants and replacing the selected invariant with an invariant that is less locally inconsistent. In some embodiments, this process (acts 210-250) may be repeated until each invariant at each program point of the routine becomes locally consistent. In this manner, with a given input and expected corresponding output and with locally consistent invariants at each program point, the validity of a software routine may be proven valid or invalid.

Figure 3:
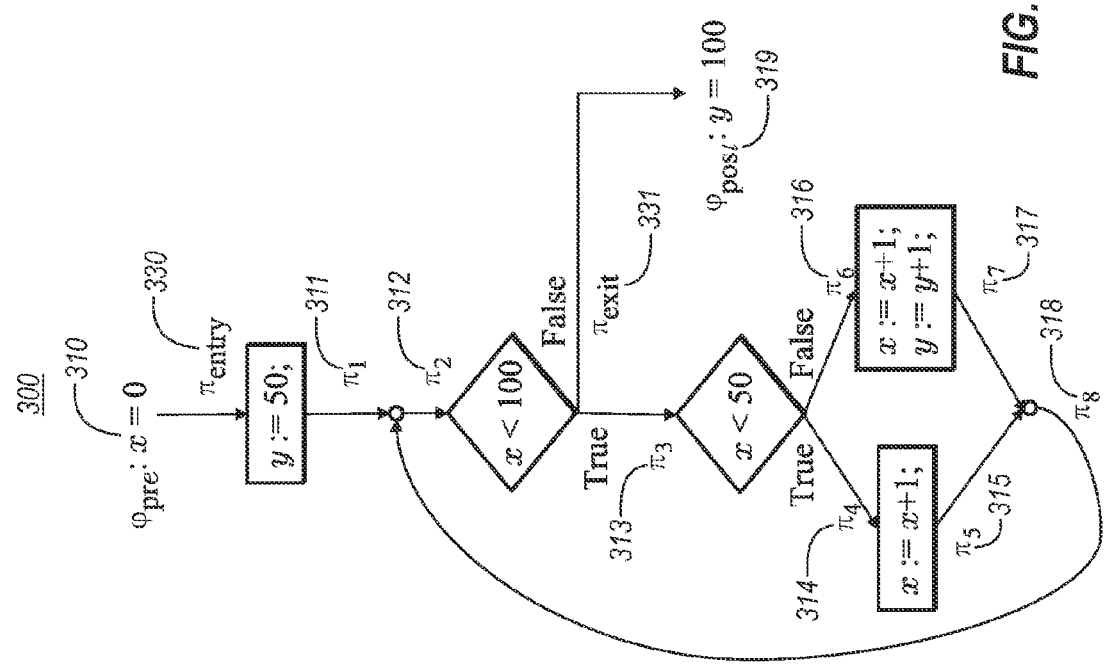
FIG. 3 illustrates an embodiment of an example program with pre and post conditions.

One exemplary embodiment is shown in FIG. 3. In this case, program verification is used to verify the Hoare triple $(\Phi_{pre}, P, \Phi_{post})$ where $\Phi_{pre}$ and $\Phi_{post}$ are the precondition and postcondition respectively of program P. The Hoare triple is said to be valid if for all program states satisfying $\Phi_{pre}$, whenever the program P terminates, it does so in a state that satisfies $\Phi_{post}$. A proof of validity of the Hoare triple $(\Phi_{pre}, P, \Phi_{post})$ can be in the form of an invariant at each program point such that the invariants can be easily verified locally at each program point. Tables 340 and 350 indicate the invariant sampled at each program point, $\pi_0$ to $\pi_9$. For example, the program "P" begins at point 310 where precondition $\Phi_{pre}$ is set to x=0. The program P ends at point 319 where postcondition $\Phi_{post}$ is set to y=100. The Hoare triple $(\Phi_{pre}, P, \Phi_{post})$ is valid in this case because when the program is executed with x=0, it ends in a state that satisfies y=100.

The beginning of the program is signified by $\pi_{entry}$ at point 330. At $\pi_1$ (point 311), y is defined as 50 (y:=50). At $\pi_2$ (point 312), the program questions whether x<100. If yes, then go to $\pi_3$ (point 313) at which point the program questions whether x<50; if no, then go $\pi_{exit}$ (point 331) and exit the program. If x<50 is true, take program path $\pi_4$ (point 314) and at $\pi_5$ (point 315) define x:=x+1. Then proceed to $\pi_8$ (point 318) and question again whether x<100. After $\pi_3$, if x<50, take program path $\pi_6$ (point 316) to $\pi_7$ (point 317) where x and y are defined as x+1 and y+1, respectively. Then, similar to path $\pi_4$, proceed to $\pi_8$ and question whether x<100. The process of proving validity starts with initializing the guesses for the invariants to any chosen value. Then, after each iteration of the process described earlier, the invariants should become less inconsistent with their neighboring invariants until consistency is achieved and the program is proven valid. In one embodiment, the invariants described in table 340 are discovered.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a processor and system memory, a method for verifying the validity or invalidity of a software routine by learning appropriate invariants at each program point, the method comprising:
    an act of choosing an abstract domain that expresses the appropriate invariants;
    an act of associating, using the processor, a local inconsistency measure with any two abstract elements of the abstract domain, wherein the measure is a monotonic function of the difference of the sets of states represented by the two abstract elements of the abstract domain;
    an act of searching for a set of local invariants that optimize a total inconsistency measure which includes a sum of local inconsistency measures;
    an act of optimizing the total inconsistency measure for all input/output pairs of the software routine; and
    an act of randomly selecting an invariant that is locally inconsistent with the invariant's neighboring invariants and replacing the selected invariant with an invariant that is less locally inconsistent.

2. The method of claim 1, further comprising:
    an act of determining whether an invariant at a program point is locally consistent with the invariant's neighboring invariants; and
    upon determining that an invariant is locally inconsistent with the invariant's neighboring invariants, an act of sampling a different invariant that is less locally inconsistent with the invariant's neighboring invariants.

3. The method of claim 1, wherein the abstract domain comprises a set of formulas with bounded Boolean connectives over difference constraints.

4. The method of claim 1, wherein the inconsistency measure is the proportion of the disjuncts in the disjunctive normal form version of a first boolean formula that do not logically imply the conjuncts in the conjunctive normal form version of a second boolean formula.

5. The method of claim 1, wherein the probability of selecting an invariant at a program point is inversely proportional to its local inconsistency.

6. The method of claim 1, further comprising an act of repeating the acts of claim 1 until all invariants become locally consistent.

7. The method of claim 1, wherein the number of possible abstract domains is unbounded.

8. The method of claim 1, further comprising at least one of learning and discovering one or more small programs from the one or more program's specifications in terms of a set of the program's input-output behavior.

9. A computer program product comprising one or more computer readable storage media having stored thereon computer-executable instructions that, when executed by one or more processors of a computing system, cause the computing system to perform a method for verifying the validity or invalidity of a software routine by learning appropriate invariants at each program point, the method comprising:
   an act of choosing an abstract domain that expresses the appropriate invariants;
   an act of associating a local inconsistency measure with any two abstract elements of the abstract domain, wherein the measure is a monotonic function of the difference of the sets of states represented by the two abstract elements of the abstract domain;
   an act of searching for a set of local invariants that optimize a total inconsistency measure which includes a sum of local inconsistency measures;
   an act of optimizing the total inconsistency measure for all input/output pairs of the software routine; and
   an act of randomly selecting an invariant that is locally inconsistent with the invariant's neighboring invariants and replacing the selected invariant with an invariant that is less locally inconsistent.

10. The computer program product of claim 9, further comprising:
    an act of determining whether an invariant at a program point is locally consistent with the invariant's neighboring invariants; and
    upon determining that an invariant is locally inconsistent with the invariant's neighboring invariants, an act of sampling a different invariant that is less locally inconsistent with the invariant's neighboring invariants.

11. The computer program product of claim 9, wherein the abstract domain comprises a set of formulas with bounded Boolean connectives over difference constraints.

12. The computer program product of claim 9, wherein the inconsistency measure is the proportion of the disjuncts in the disjunctive normal form version of a first Boolean formula that do not logically imply the conjuncts in the conjunctive normal form version of a second Boolean formula.

13. The computer program product of claim 9, wherein the probability of selecting an invariant at a program point is inversely proportional to its local inconsistency.

14. The computer program product of claim 9, further comprising an act of repeating the acts of claim 9 until all invariants become locally consistent.

15. The computer program product of claim 9, wherein the number of possible abstract domains is unbounded.

16. A computer system for verifying the validity or invalidity of a software routine by learning appropriate invariants at each program point, the system comprising:
    a processor;
    system memory;
    an abstract domain selection module for choosing an abstract domain that expresses the appropriate invariants;
    an inconsistency measure association module for associating an inconsistency measure with any two abstract elements of the abstract domain, wherein the measure is a monotonic function of the difference of the sets of states represented by the two abstract elements of the abstract domain
    a local invariant searching module for searching for a set of local invariants that optimize a total inconsistency measure which includes a sum of local inconsistency measures;
    an inconsistency measure optimization module for optimizing the total inconsistency measure for all input/output pairs of the software routine; and
    an invariant selection module for randomly selecting an invariant that IS locally inconsistent with the invariant's neighboring invariants and replacing the selected invariant with an invariant that IS less locally inconsistent.

17. The system of claim 16, the system further comprising:
    a consistency determination module for determining whether an invariant at a program point is locally consistent with the invariant's neighboring invariants; and
    an invariant sampling module that, upon determining that an invariant is locally inconsistent with the invariant's neighboring invariants, samples a different invariant that is less locally inconsistent with the invariant's neighboring invariants.

18. The system of claim 16, wherein the abstract domain comprises a set of formulas with bounded boolean connectives over difference constraints.

19. The system of claim 16, wherein the inconsistency measure is the proportion of the disjuncts in the disjunctive normal form version of a first boolean formula that do not logically imply the conjuncts in the conjunctive normal form version of a second boolean formula.

20. The system of claim 16, wherein the probability of selecting an invariant at a program point is inversely proportional to its local inconsistency, and the method of claim 1 is repeated until all invariants become locally consistent.

* * * * *